(12) United States Patent
Kim et al.

(10) Patent No.: US 10,507,744 B2
(45) Date of Patent: *Dec. 17, 2019

(54) RELAXING SEAT FOR VEHICLE

(71) Applicants: Hyundai Motor Company, Seoul (KR); Kia Motors Corporation, Seoul (KR); DAE WON SAN UP CO., LTD, Ansan-si (KR)

(72) Inventors: Eun Sue Kim, Ansan-si (KR); Seung Hyeok Chang, Suwon-si (KR); Dae Ig Jung, Suwon-si (KR); Sun Ho Hur, Seoul (KR); Young Cheol Jang, Ansan-si (KR); Sang Yong Koo, Incheon (KR); Byoung Su You, Siheung-si (KR); Tae Hyung Kim, Siheung-si (KR); Jong Ho Lim, Suwon-si (KR); Dong Hwi Kim, Ansan-si (KR)

(73) Assignees: Hyundai Motor Company, Seoul (KR); Kia Motors Corporation, Seoul (KR); DAE WON SAN UP CO., LTD, Ansan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/945,493

(22) Filed: Apr. 4, 2018

(65) Prior Publication Data

US 2019/0168644 A1 Jun. 6, 2019

(30) Foreign Application Priority Data

Dec. 6, 2017 (KR) .................... 10-2017-0166339

(51) Int. Cl.
*B60N 2/34* (2006.01)
*B60N 2/04* (2006.01)
(Continued)

(52) U.S. Cl.
CPC ............. *B60N 2/34* (2013.01); *B60N 2/0232* (2013.01); *B60N 2/04* (2013.01); *B60N 2/995* (2018.02); *B60N 2002/024* (2013.01)

(58) Field of Classification Search
CPC . B60N 2/34; B60N 2/36; B60N 2/995; B60N 2/0232; B60N 2/04; B60N 2002/024; B60N 2/07; B60N 2/0722; B64D 11/0641
See application file for complete search history.

(56) References Cited

U.S. PATENT DOCUMENTS 6,170,786 B1 * 1/2001 Park ..................... B60N 2/0232
248/274.1
6,375,119 B2 * 4/2002 Park ..................... A47C 1/0352
244/118.5

(Continued)

FOREIGN PATENT DOCUMENTS

KR 10-2005-0036555 A 4/2005

*Primary Examiner* — Philip F Gabler
(74) *Attorney, Agent, or Firm* — Morgan, Lewis & Bockius LLP (57) ABSTRACT

A relaxing seat for a vehicle may include a fixed rail fixed to a vehicle body; a first moving rail coupled to the fixed rail; a second moving rail coupled to the first moving rail; a back link rotatably coupled to the fixed rail and a seat back frame; a cushion rear-side link including first and second end portions, wherein the first end portion is rotatably coupled to a portion at which a lower end portion of the seat back frame and a rear end portion of a seat cushion frame are rotatably coupled to each other, and the second end portion is rotatably coupled to the first moving rail; and a cushion front-side frame including a first end portion and a second end portion, wherein the first end portion is rotatably coupled to a front end portion of the seat cushion frame, and the second end portion of which is fixedly coupled to the second moving rail.

10 Claims, 9 Drawing Sheets

(51) Int. Cl.
*B60N 2/90* (2018.01)
*B60N 2/02* (2006.01)

(56) References Cited

U.S. PATENT DOCUMENTS

| | | | | |
|---|---|---|---|---|
| 6,767,040 B1* | 7/2004 | Freijy | ............... | B60N 2/3031 |
| | | | | 296/65.09 |
| 6,929,320 B2* | 8/2005 | Laurent | ............... | B60N 2/22 |
| | | | | 297/83 |
| 7,182,404 B2* | 2/2007 | Laurent | ............... | B60N 2/34 |
| | | | | 297/411.39 |
| 7,401,857 B2* | 7/2008 | Laux | ............... | B60N 2/06 |
| | | | | 297/188.04 |
| 7,472,957 B2* | 1/2009 | Ferry | ............... | B60N 2/206 |
| | | | | 297/343 |
| 8,579,375 B2* | 11/2013 | Marais | ............... | B64D 11/06 |
| | | | | 297/341 |
| 10,106,057 B2* | 10/2018 | Epaud | ............... | B60N 2/07 |
| 2015/0375865 A1 | 12/2015 | Fischer et al. | | |
| 2016/0159256 A1* | 6/2016 | Szlag | ............... | B60N 2/065 |
| 2017/0275003 A1* | 9/2017 | Erhel | ............... | B60N 2/06 |
| 2017/0313209 A1* | 11/2017 | Yoshida | ............... | B60N 2/07 |
| 2018/0272896 A1* | 9/2018 | Park | ............... | B60N 2/995 |

* cited by examiner

RELAXING SEAT FOR VEHICLE

CROSS REFERENCE TO RELATED APPLICATION

The present application claims priority to Korean Patent Application No. 10-2017-0166339 filed on Dec. 6, 2017, the entire contents of which is incorporated herein for all purposes by this reference.

BACKGROUND OF THE PRESENT INVENTION

Field of the Present Invention

The present invention relates to a relaxing seat for a vehicle and, more particularly, to a technology relating to a relaxing seat for a vehicle, the seat being configured for implementing a relaxing mode and a full bed mode.

Description of Related Art

An autonomous vehicle is a smart vehicle employing an autonomous driving technology by which the vehicle can reach a destination by itself without driver control of a handle, an accelerator pedal, a brake, or the like. Recently, the development of the autonomous vehicle has progressed rapidly.

In a situation of an autonomous driving mode, a passenger of a vehicle should be able to rest conveniently in various postures. To this end, a seat of a vehicle is required to be modified in various modes with respect to angles of a seat backrest and a seat cushion, for convenience of passenger rest.

For example, in a case of long distance travel in an autonomous driving mode, a seat of a vehicle is required to be changeable into a full bed state. However, in a conventional seat in which the angle of a seat backrest is adjusted by use of a reclining apparatus, a stepped portion having an abrupt height difference is formed between a seat backrest and a seat cushion due to structural characteristics of the reclining apparatus when the conventional seat is switched into a full bed state. Therefore, the conventional seat has a disadvantage that a passenger cannot conveniently rest thereon.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a relaxing seat for a vehicle, the seat being configured for implementing a relaxing mode through variously adjusting the angles of a seat backrest and a seat cushion and a full bed mode in which a stepped portion is not formed between a seat backrest and a seat cushion, providing a passenger with improved convenience.

In accordance with the above aspect, a relaxing seat for a vehicle according to an exemplary embodiment of the present invention may include: a fixed rail disposed to a vehicle body and extending in a front and a rear direction; a first moving rail coupled to the fixed rail to be movable frontwards and backwards thereof along the fixed rail; a second moving rail coupled to the first moving rail to be movable frontwards and backwards thereof along the first moving rail; a back link, both end portions of which are rotatably coupled to the fixed rail and a seat back frame, respectively; a cushion rear-side link including a first end portion and a second end portion, wherein the first end portion is rotatably coupled to a portion at which a lower end portion of the seat back frame and a rear end portion of a seat cushion frame are rotatably coupled to each other, and the second end portion is rotatably coupled to the first moving rail; and a cushion front-side frame including a first end portion and a second end portion, wherein the first end portion is rotatably coupled to a front end portion of the seat cushion frame, and the second end portion is fixedly coupled to the second moving rail.

The relaxing seat may further include a first motor which is connected to the first moving rail and provides power to move the first moving rail along the fixed rail; and a second motor which is connected to the second moving rail and provides power to move the second moving rail along the first moving rail.

The relaxing seat may further include a leg rest rotatably coupled to the cushion front-side frame, wherein the leg rest is configured to allow an angle thereof to be individually adjusted regardless of the seat back frame and the seat cushion frame.

The relaxing seat may further include a torsion spring, both end portions of which are fixed to the fixed rail and a hinge shaft on a lower end portion of the back link, respectively, wherein the torsion spring provides an elastic force to the back link to rotate the back link in a direction allowing the back link to be vertically erected.

When the first moving rail moves forward, the second moving rail moves together with the first moving rail.

The second moving rail can individually move regardless of the first moving rail.

On the basis of an initial state in which rear end portions of the fixed rail, and the first and the second moving rail are aligned on an identical line, when the first moving rail and the second moving rail move forward together, an angle of the seat cushion frame is maintained at an angle identical to that of the initial state and an angle of the seat back frame is changed so that the seat back frame is reclined rearward thereof, implementing a relaxing mode.

On the basis of the initial state, when the first moving rail and the second moving rail move forward together and then only the second moving rail moves further forward, the angles of the seat cushion frame and the seat back frame are changed together and then the seat cushion frame and the seat back frame become horizontal to the fixed rail, implementing a full bed mode.

When the full bed mode is implemented, a stepped portion does not occur on a connecting portion between the seat cushion frame and the seat back frame.

On the basis of an initial state in which rear end portions of the fixed rail, and the first and the second moving rail are aligned on an identical line, when a position of the first moving rail is fixed and only the second moving rail moves forward, an angle of the seat cushion frame is changed such that the seat cushion frame is horizontal to the fixed rail and an angle of the seat back frame is changed such that the seat back frame is reclined rearward thereof, implementing a relaxing mode.

In a relaxing seat according to an exemplary embodiment of the present invention, the angles of a seat backrest and a seat cushion may be variously adjusted using one fixed rail and two moving rails which are connected to a seat back frame and a seat cushion frame, implementing a plurality of relaxing modes and a full bed mode in which a stepped portion between the seat backrest and the seat cushion does not occur. Therefore, the present invention can remarkably improve the convenience of a passenger.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a relaxing seat for a vehicle according to an exemplary embodiment of the present invention will be described with reference to the accompanying drawings.

Figure 1:
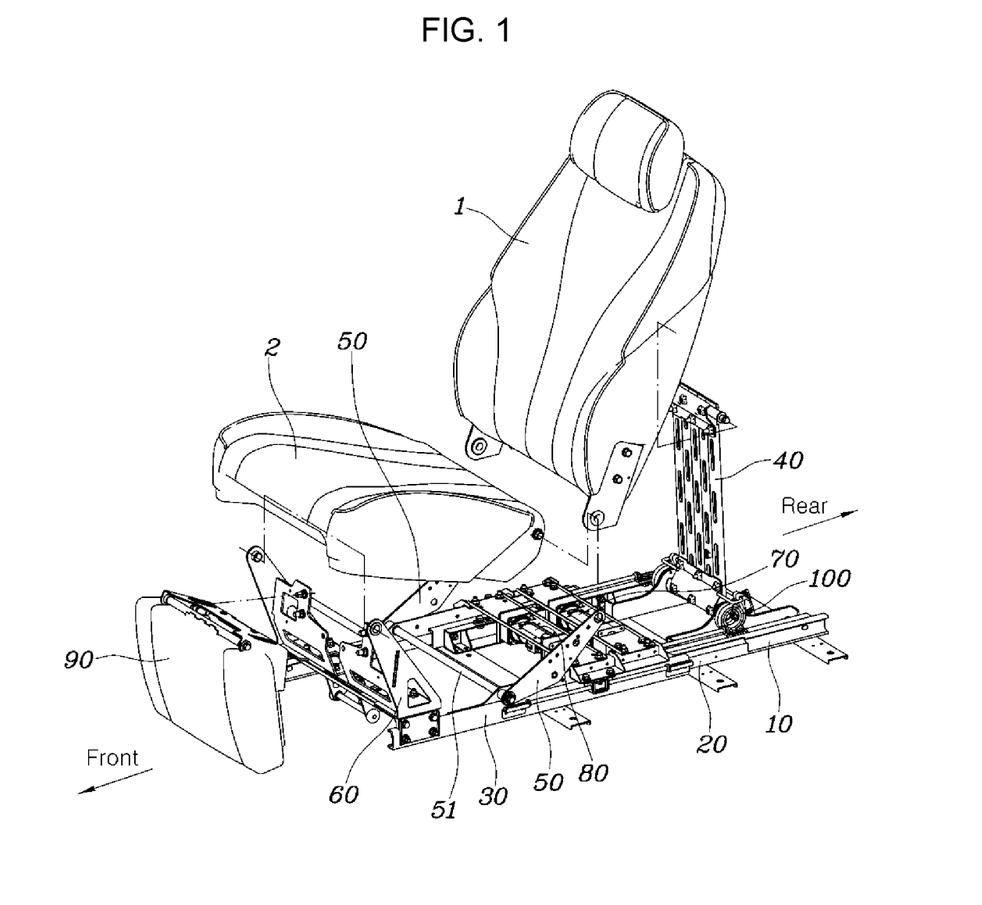
FIG. 1 is an exploded perspective view of a relaxing seat for a vehicle according to an exemplary embodiment of the present invention.
Figure 2:
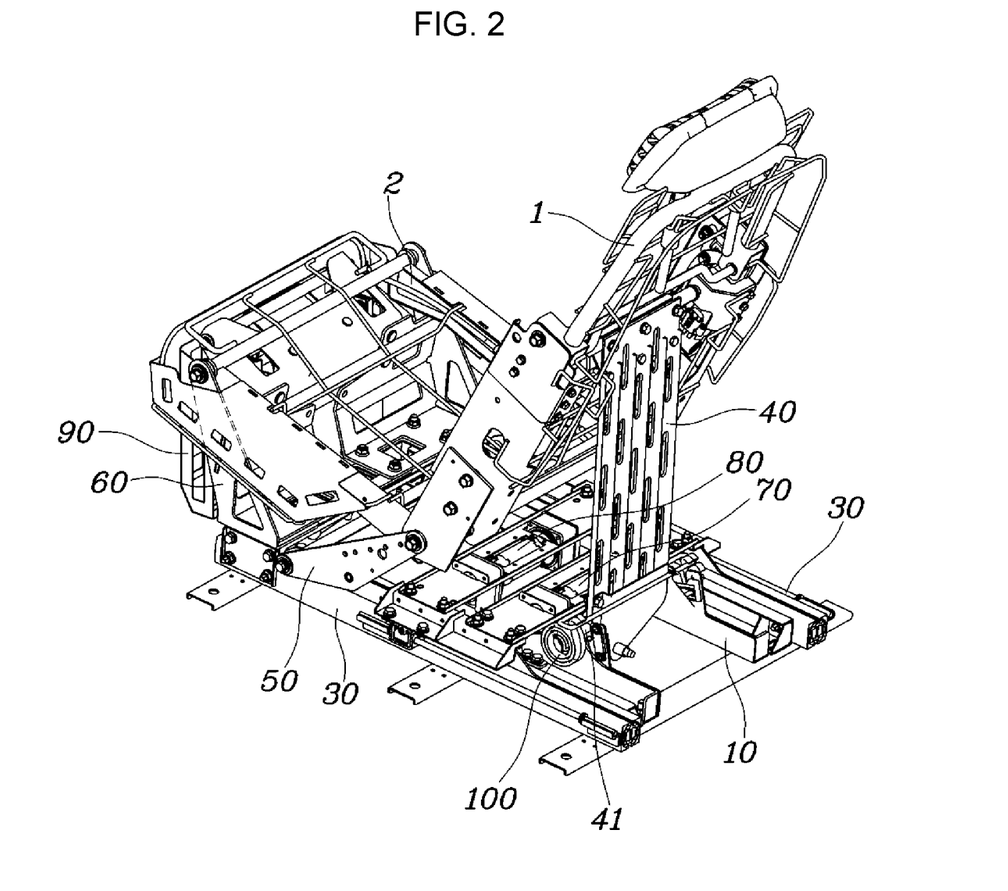
FIG. 2 and FIG. 3 are a perspective view and a side view of an initial state of a relaxing seat in which rear end portions of a fixed rail, and a first and a second moving rail are aligned on an identical line.
Figure 3:
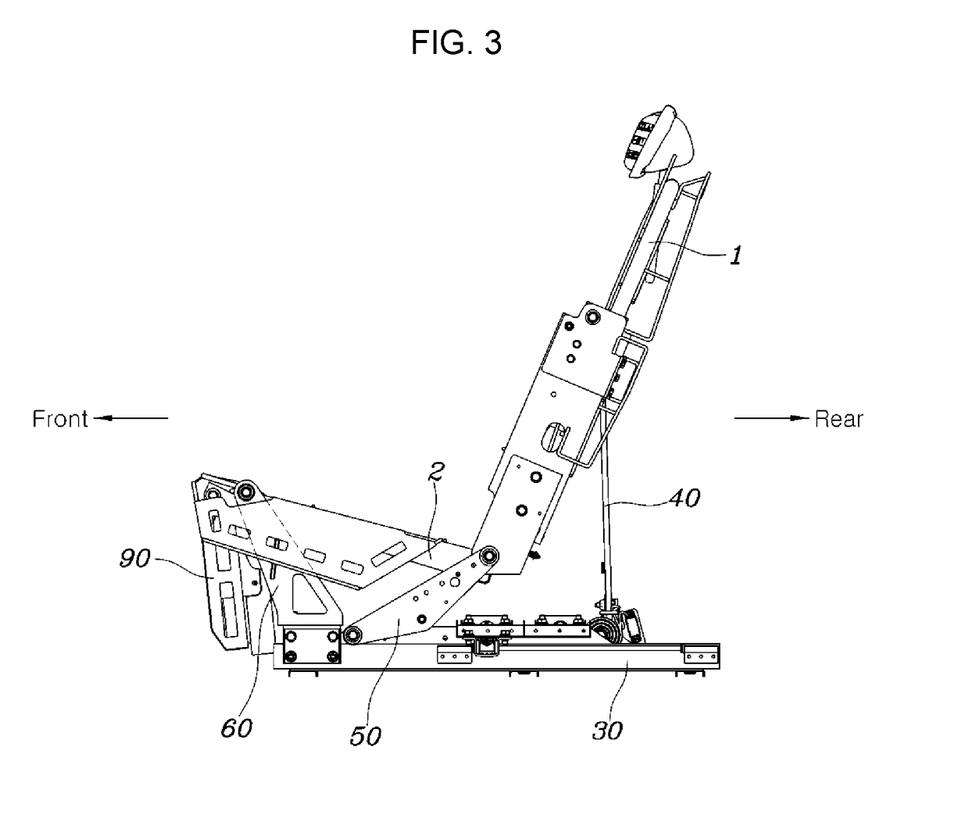

As illustrated in FIG. 1, FIG. 2, and FIG. 3, a relaxing seat for a vehicle according to an exemplary embodiment of the present invention includes: a fixed rail 10 disposed to a vehicle body and extending in a front and a rear direction; a first moving rail 20 coupled to the fixed rail 10 to be movable frontwards and backwards thereof along the fixed rail 10; a second moving rail 30 coupled to the first moving rail 20 to be movable frontwards and backwards thereof along the first moving rail 20; a back link 40, both end portions of which are rotatably coupled to the fixed rail 10 and a seat back frame 1, respectively; a cushion rear-side link 50 including a first end portion and a second end portion, wherein the first end portion is rotatably coupled to a portion at which a lower end portion of the seat back frame 1 and a rear end portion of a seat cushion frame 2 are rotatably coupled to each other, and the second end portion is rotatably coupled to the first moving rail 20; and a cushion front-side frame 60 including a first end portion and a second end portion, wherein the first end portion is rotatably coupled to a front end portion of the seat cushion frame 2, and the second end portion is fixedly coupled to the second moving rail 30.

The relaxing seat includes two cushion rear-side links 50 disposed at a left and a right side of the seat cushion frame 2, respectively. That is, a link shaft 51 is coupled to the first moving rail 20 to extend through the first moving rail 20 in a left and a right direction thereof, lower end portions of cushion rear-side links 50 are rotatably coupled to both end portions of the link shaft 51, respectively, and upper end portions of the cushion rear-side links 50 are rotatably coupled to a portion at which the lower end portion of the seat back frame 1 and the rear end portion of the seat cushion frame 2 are rotatably coupled to each other.

FIG. 1 illustrates a seat backrest (pad) and a seat cushion (pad) instead of a frame, as shapes of the seat back frame 1 and the seat cushion frame 2. However, the seat back frame 1 and the seat cushion frame 2 will be referred to as a frame for understanding of the present invention.

Furthermore, the relaxing seat of the present invention may further include a first motor 70 which is connected to the first moving rail 20 and provides power to move the first moving rail 20 along the fixed rail 10; and a second motor 80 which is connected to the second moving rail 30 and provides power to move the second moving rail 30 along the first moving rail 20.

The first motor 70 moves the first moving rail 20 forwards and backwards along the fixed rail 10. For example, in a case of a structure in which the first motor 70 is connected to the first moving rail 20, a gear member is coupled to a shaft of the first motor 70, a lead screw is screw-coupled through the gear member, and the lead screw is disposed to the fixed rail 10 to extend frontward and rearward thereof, the first moving rail 20 can move frontward and rearward along the fixed rail 10 when the first motor 70 is operated.

The second motor 80 moves the second moving rail 30 frontwards and rearwards thereof along the first moving rail 20. A configuration required for the movement is the same as or substantially the same as that of the first motor 70 as described above.

Also, the relaxing seat according to an exemplary embodiment of the present invention further includes a leg rest 90 rotatably coupled to the cushion front-side frame 60. The angle of the leg rest 90 can be individually adjusted regardless of the seat back frame 1 and the seat cushion frame 2.

That is, the leg rest 90 can be independently operated using a separate power source regardless of adjusting the angles of the seat back frame 1 and the seat cushion frame 2.

Furthermore, the relaxing seat according to an exemplary embodiment of the present invention further includes a torsion spring 100, both end portions of which are fixed to the fixed rail 10 and a hinge shaft 41 on a lower end portion of the back link 40. The torsion spring 100 provides an elastic force to the back link 40 to rotate the back link 40 in a direction allowing the back link 40 to be vertically erected.

Hereinafter, a procedure of implementing a relaxing mode and a full bed mode using the relaxing seat according to an exemplary embodiment of the present invention will be described.

FIG. 2 and FIG. 3 are a perspective view and a side view of an initial state of a relaxing seat in which rear end portions of the fixed rail 10, the first moving rail 20, and the second moving rail 30 are aligned on an identical line.

Figure 4:
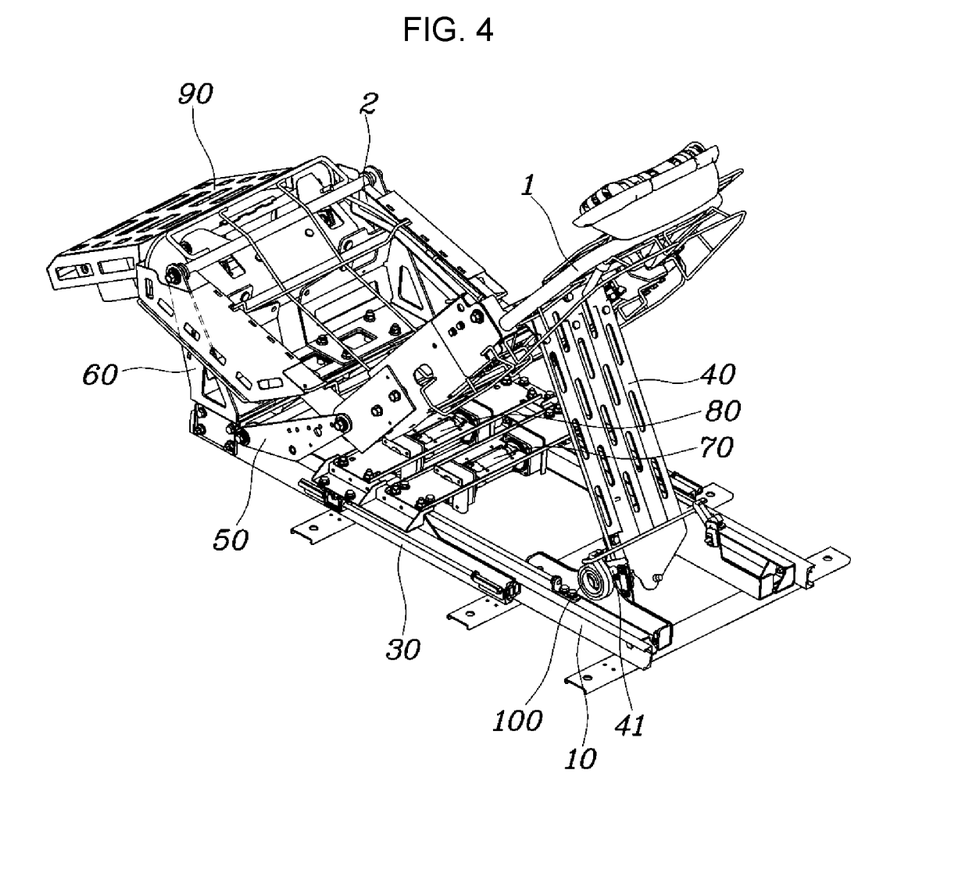
FIG. 4 and FIG. 5 are a perspective view and a side view of a relaxing seat according to an exemplary embodiment of the present invention in a relaxing mode implemented when the first and the second moving rail have moved forward together from the initial state.
Figure 5:
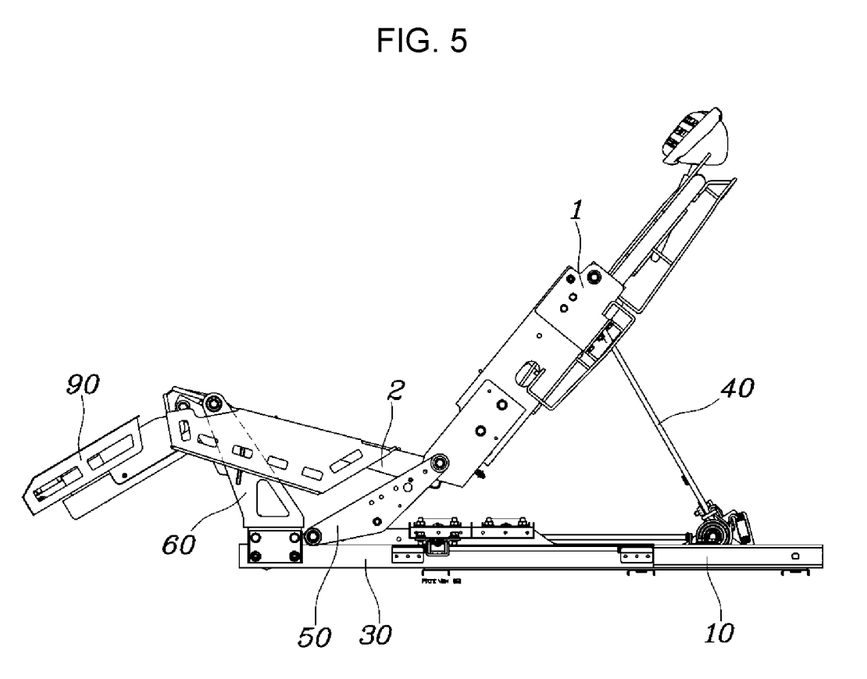

In the initial state as mentioned above, when the first motor 70 is operated, a force is applied to the first moving rail 20 to move the first moving rail 20 forward thereof. As such, a front end portion of the first moving rail 20 is in contact with the second moving rail 30. Therefore, when the first motor 70 is operated, the first moving rail 20 and the second moving rail 30 move forward together as illustrated in FIG. 4 and FIG. 5.

When the first moving rail 20 and the second moving rail 30 are moved forward together by the operation of the first motor 70 from the initial state of the relaxing seat, the angle of the seat cushion frame 2 is maintained at an angle identical to that of the initial state, and the angle of the seat back frame 1 is changed, so that the seat back frame 1 is reclined rearward thereof. Accordingly, a first relaxing mode is implemented.

Figure 6:
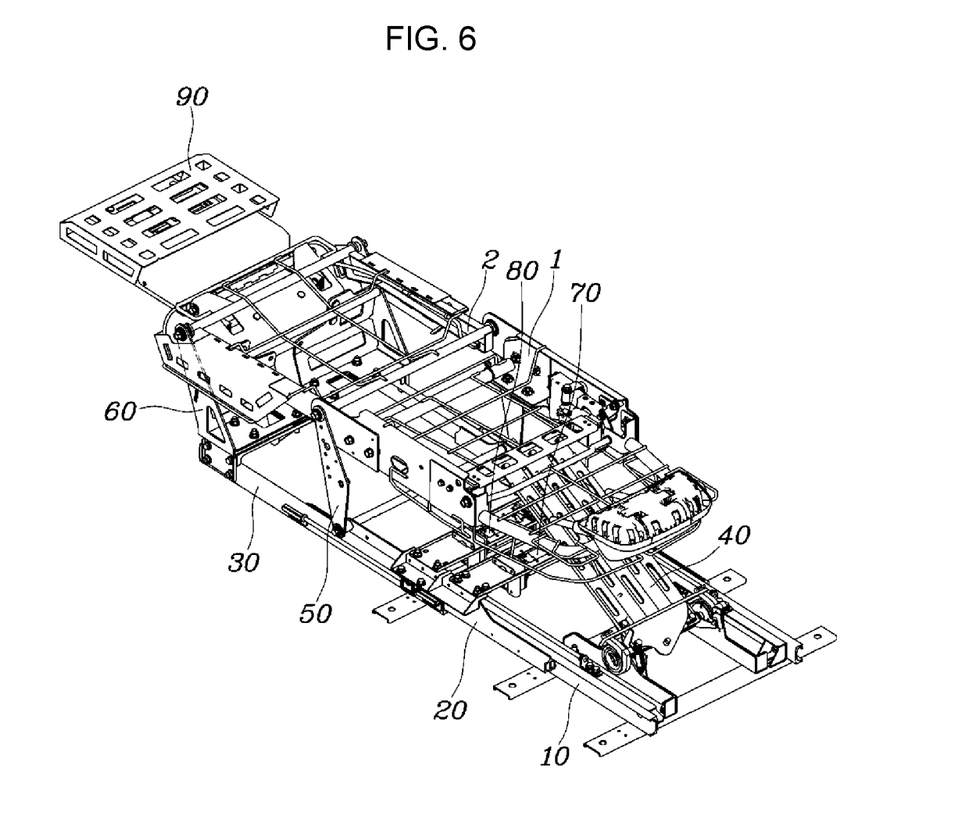
FIG. 6 and FIG. 7 are a perspective view and a side view of a full bed mode implemented when only the second moving rail has moved further forward from the relaxing mode state of FIG. 4 and FIG. 5.
Figure 7:
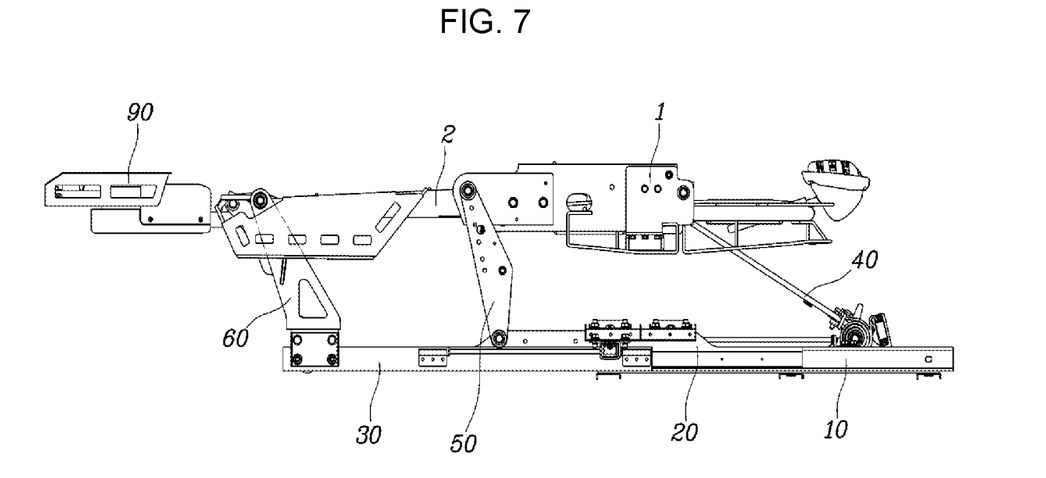

The second moving rail 30 is individually movable regardless of the first moving rail 20. That is, in the first relaxing mode as illustrated in FIG. 4 and FIG. 5, when the second motor 80 is operated, only the second moving rail 30 moves further forward as illustrated in FIG. 6 and FIG. 7. As a result, the angles of both the seat cushion frame 2 and the seat back frame 1 are changed so that the seat cushion frame 2 and the seat back frame 1 become horizontal to the fixed rail 10. Accordingly, a full bed mode can be implemented.

When the full bed mode is implemented in the relaxing seat according to an exemplary embodiment of the present invention, the seat cushion frame 2 and the seat back frame 1 are horizontal to the fixed rail 10. Therefore, a stepped portion does not occur on a connecting portion between the seat cushion frame 2 and the seat back frame 1. Accordingly, a passenger can rest in a more comfortable state.

Figure 8:
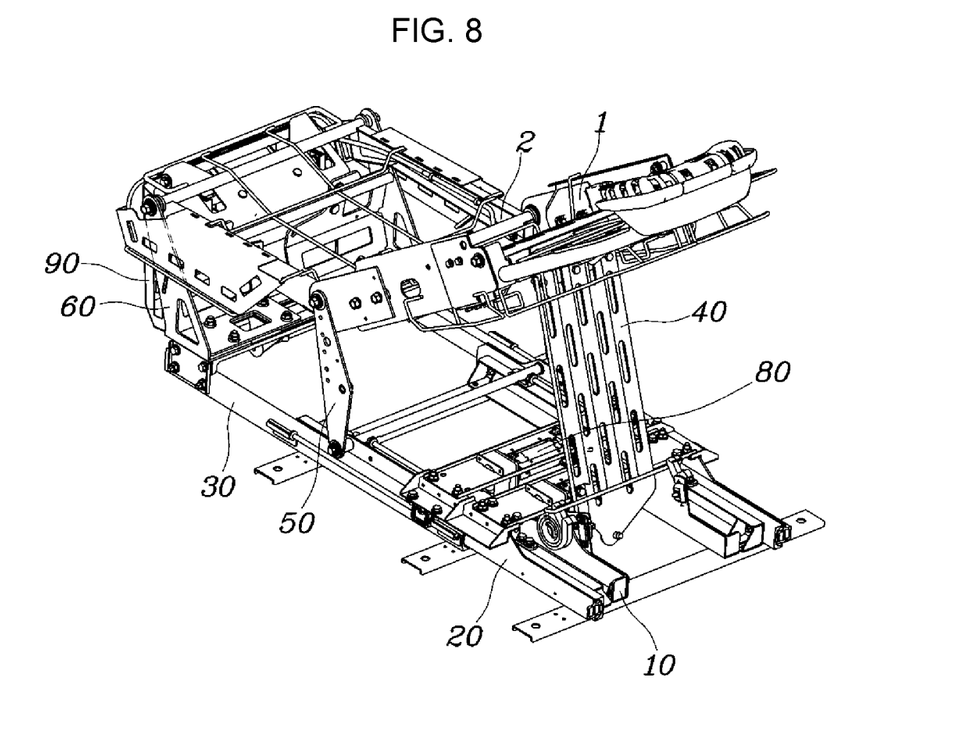
FIG. 8 and FIG. 9 are a perspective view and a side view of a relaxing seat according to an exemplary embodiment of the present invention in a relaxing mode implemented when only the second moving rail has moved further forward from the initial state.
Figure 9:
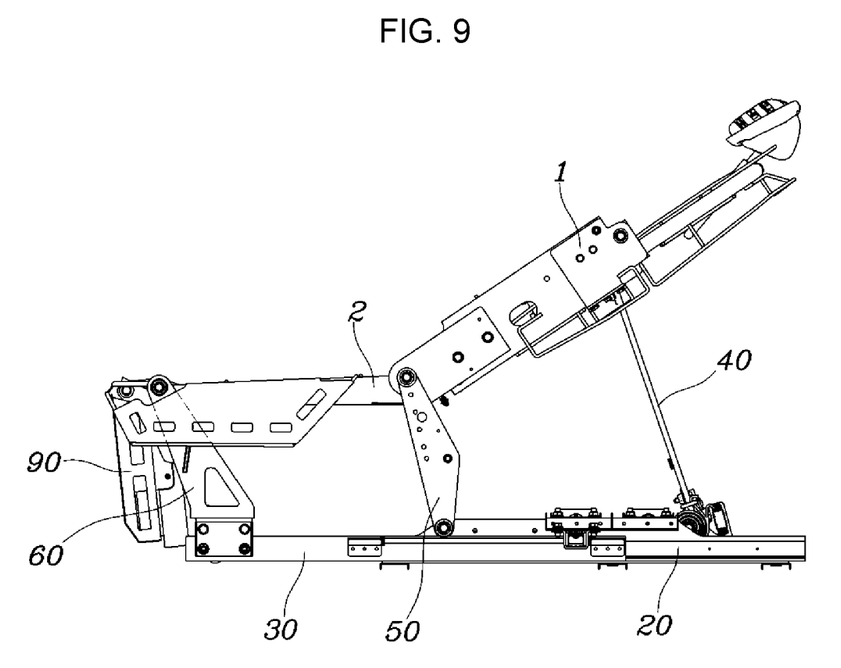

Furthermore, when only the second motor 80 is operated in the initial state of the relaxing seat as illustrated in FIG. 2 and FIG. 3, the first moving rail 20 is fixed at a position thereof in the initial state and only the second moving rail 30 moves forward along the first moving rail 20, as illustrated in FIG. 8 and FIG. 9. As a result, the angle of the seat cushion frame 2 is changed such that the seat cushion frame 2 is horizontal to the fixed rail 10, and the angle of the seat back frame 1 is changed such that the seat back frame 1 is reclined rearward further than in the first relaxing mode as illustrated in FIG. 4 and FIG. 5. Accordingly, a second relaxing mode is implemented.

Meanwhile, a returning procedure from the first and the second relaxing mode and the full bed mode to the initial state proceeds in an order reverse from that of the above description, and a detail description about the returning procedure is omitted.

According to an exemplary embodiment of the present inventions as described above, the angles of a seat backrest and a seat cushion can be variously adjusted using one fixed rail 10 and two moving rails 20 and 30 which are connected to the seat back frame 1 and the seat cushion frame 2, implementing a plurality of relaxing modes and a full bed mode in which a stepped portion between the seat backrest and the seat cushion does not occur. Therefore, the present invention can remarkably improve the convenience of a passenger.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A relaxing seat for a vehicle, the relaxing seat comprising:
    a fixed rail fixed to a vehicle body and extending in a front and a rear direction of the vehicle body;
    a first moving rail coupled to the fixed rail to be movable frontwards and backwards thereof along the fixed rail;
    a second moving rail coupled to the first moving rail to be movable frontwards and backwards thereof along the first moving rail;
    a back link, first and second end portions of which are rotatably coupled to the fixed rail and a seat back frame, respectively;
    a cushion rear-side link including a first end portion and a second end portion, wherein the first end portion is rotatably coupled to a portion at which a lower end portion of the seat back frame and a rear end portion of a seat cushion frame are rotatably coupled to each other, and the second end portion is rotatably coupled to the first moving rail; and
    a cushion front-side frame including a first end portion and a second end portion, wherein the first end portion of the cushion front-side frame is rotatably coupled to a front end portion of the seat cushion frame, and the second end portion of the cushion front-side frame is fixedly coupled to the second moving rail.

2. The relaxing seat for the vehicle of claim 1, further including:
    a first motor which is connected to the first moving rail and provides power to move the first moving rail along the fixed rail; and
    a second motor which is connected to the second moving rail and provides power to move the second moving rail along the first moving rail.

3. The relaxing seat for the vehicle of claim 1, further including:
    a leg rest rotatably coupled to the cushion front-side frame;

wherein the leg rest is configured to allow an angle of the leg rest to be separately adjusted independent of the seat back frame and the seat cushion frame.

4. The relaxing seat for the vehicle of claim 1, further including:
a torsion elastic member, first and second end portions of which are fixed to the fixed rail and a hinge shaft on a lower end portion of the back link, respectively, wherein the torsion elastic member provides an elastic force to the back link to rotate the back link in a direction allowing the back link to be vertically erected.

5. The relaxing seat for the vehicle of claim 1, wherein, when the first moving rail moves forward of the relaxing seat, the second moving rail moves with the first moving rail.

6. The relaxing seat for the vehicle of claim 5, wherein, on a basis of an initial state in which rear end portions of the fixed rail, and the first moving rail and the second moving rail are aligned on an identical line, when the first moving rail and the second moving rail move forward together, an angle of the seat cushion frame is maintained identical to an angle of the initial state and an angle of the seat back frame is changed so that the seat back frame is reclined rearward thereof, implementing a relaxing mode.

7. The relaxing seat for the vehicle of claim 6, wherein, on a basis of the initial state, when the first moving rail and the second moving rail move forward together and then the second moving rail moves further forward of the relaxing seat, the angles of the seat cushion frame and the seat back frame are changed together and then the seat cushion frame and the seat back frame is horizontal to the fixed rail, implementing a full bed mode.

8. The relaxing seat for the vehicle of claim 7, wherein, when the full bed mode is implemented, the seat cushion frame and the seat back frame are aligned in a same level so as to prevent the seat cushion frame and the seat back frame from being aligned stepwise.

9. The relaxing seat for the vehicle of claim 5, wherein, on a basis of an initial state in which rear end portions of the fixed rail, and the first moving rail and the second moving rail are aligned on an identical line, when a position of the first moving rail is fixed and the second moving rail moves forward thereof, an angle of the seat cushion frame is changed such that the seat cushion frame is horizontal to the fixed rail and an angle of the seat back frame is changed such that the seat back frame is reclined rearward thereof, implementing a relaxing mode.

10. The relaxing seat for the vehicle of claim 1, wherein the second moving rail is configured to separately move independent of the first moving rail.

* * * * *